United States Patent [19]
McShane

[11] 3,886,794
[45] June 3, 1975

[54] FLOWMETER APPARATUS AND METHOD
[75] Inventor: James L. McShane, Pittsburgh, Pa.
[73] Assignee: Westinghouse Electric Corporation, Pittsburgh, Pa.
[22] Filed: Mar. 11, 1974
[21] Appl. No.: 450,273

[52] U.S. Cl............................. 73/194 B; 73/194 A
[51] Int. Cl. .............................................. G01f 1/00
[58] Field of Search ........... 73/194 A, 194 B, 194 E

[56] References Cited
UNITED STATES PATENTS
3,762,221  10/1973  Coulthard .......................... 73/194
3,788,141  1/1974  Blackwell .......................... 73/194
3,818,877  6/1974  Barrera et al. ..................... 73/194

Primary Examiner—Herbert Goldstein
Attorney, Agent, or Firm—C. M. Lorin

[57] ABSTRACT

The flowmeter technique involves directing acoustic signals along separate acoustic paths through vortices created in a stream of fluid and combining the detected acoustic signals to enhance the modulation effect by the vortices thereby to facilitate detection of the characteristic frequency.

27 Claims, 9 Drawing Figures

(TEST CONDUCTED WITH TRANSDUCERS 41, 42 OF FIG.6)

FLOWMETER APPARATUS AND METHOD

BACKGROUND OF THE INVENTION

The invention relates to flowmeter technique in general, and more particularly to method and apparatus for the determination of fluid velocity from the detection of the modulation caused to an acoustic wave by the disturbances generated by an obstacle to the flow of the fluid. It is well known that when an obstacle exists in a region of fluid flow, for instance a strut disposed across the stream, vortices are, under certain conditions, generated in the wake of the obstacle. This has been referred to as the Karman effect. These vortices have a definite spacing. They also move in the stream with a relative velocity and are animated with a rotational movement of a certain periodicity. The physical phenomena involved in the Karman effect are determined by the geometry of the obstacle and by the velocity of the fluid past the obstacle. It is remarkable that the periodicity of the generation of substantially equally spaced vortices moving downstream in the wake of the obstacle, and therefore, the periodicity of passing of the vortices at a location on the side of the vortex sheet, is characteristic of the velocity of the fluid.

Several flowmeters are known from the prior art which employ an acoustic beam propagated through such disturbances and use a receiving transducer to detect the modulation of the beam by the disturbances in order to measure the velocity of the fluid. Such a flowmeter is described in U.S. Pat. No. 3,680,375 of R. D. Joy and R. F. Colton entitled "Sonic Velocity Sensing" issued Aug. 1, 1972. The beam is refracted and/or reflected by the vortices and the acoustic energy received provides an amplitude modulated signal having a frequency of modulation which is a measure of the fluid velocity. As described in Control Engineering, December, 1969, pages 73–75, the disturbances caused by an obstacle in a stream, are actually a shift of the flow from one side of the obstacle to the other generating the vortices in the wake thereof. Advantage has been taken of this understanding of the phenomena by directing a beam of acoustic energy in the frontal part of the obstacle with favorable results described in copending patent application Ser. No. 175,463 filed Aug. 27, 1971 by R. E. Blackwell.

Although the flowmeters of the prior art have been generally successful, the level of modulation obtained is in practice only a small fraction of the total signal amplitude and the detected signal becomes so weak when the velocity is low or with fluids having a low Reynolds number, e.g., with viscous fluids, that the method becomes impractical. Another drawback is due to the waveform of the modulation envelope which is generally not a sinusoid. When this is the case, since the frequency of modulation is usually known from counting peaks or zero-crossings, an erroneous count may result from the irregularities of the waveform. Therefore, there is a need for an increased sensitivity and an increased accuracy with such flowmeter techniques.

An object of the present invention is to provide an improved flowmeter of the type in which directed acoustic energy is modulated by fluid disturbances produced by an obstacle immersed in a stream of fluid.

It is known to determine the velocity of fluid from a measure of the travel time difference between two acoustic waves where one wave is travelling upstream, the other downstream. Such a technique is described in U.S. Pat. No. 3,653,259 of McShane, issued Apr. 4, 1972.

It is another object of the present invention to provide an improved flowmeter of the type in which at least two beams of acoustic energy are used for correlation of the information derived from the two beams after propagation in a stream of fluid.

SUMMARY OF THE INVENTION

The invention resides in measuring the velocity of a stream of fluid by generating a street of vortices in the wake of an obstacle immersed in the fluid, directing acoustic signals along separate acoustic paths through the disturbance so created and combining the received acoustic signals after modulation by the disturbance. Receiving transducers associated with each acoustic path provide the modulated signals and enhanced modulation occurs when the two modulated signals are subtracted one from the other to reduce the carrier wave received from the transmitting transducer. The enhanced modulation is detected and the frequency of the detected modulation represent the velocity to be measured.

DESCRIPTION OF THE INVENTION

Figure 1:
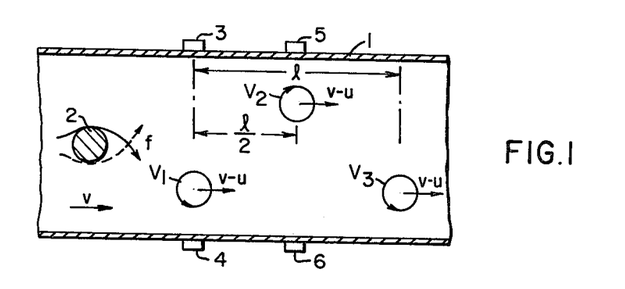
FIG. 1 shows the formation of a Karman vortex street in a conduit, and transducers mounted on opposite sides of the disturbance.

The Karman effect will be first described succinctly by reference to FIG. 1 of the drawings. A conduit 1 is shown in which flows a stream of fluid past an obstacle formed by a strut 2. Shedding occurs periodically at a frequency $f$ on either side of the strut 2, as shown. As a result vortices such as $V_1$, $V_2$, and $V_3$ are created in the wake of the strut, which alternately have a different sense of rotation. The vortices travel with the fluid, until they lose their rotional energy, at a speed which is somewhat less than the velocity $v$ of the fluid. Such velocity of the vortices can be expressed as $(v-u)$. It is also remarkable that these vortices are created with a regular spacing $l$ between vortices of the same sense of rotation, the spacing being ½ between consecutive vortices. It has been shown that $u$ is proportional to the vortex strength, hence to stream velocity $v$. Thus $$v-u = v(l-k),$$

(1)

where $k$ is a constant.

The prior art methods of measuring the stream velocity $v$ with the Karman effect are all based on the fact that the vortices are related to the frequency $f$ of shedding on either side of the strut 2, and that such frequency is itself related to the velocity $v$. When two transducers 3 and 4 are disposed on opposite sides of the zone of vortices as shown on FIG. 1, transducer 3 transmitting an acoustic wave, transducer 4 receiving the acoustic wave after modulation by the disturbances due to the strut, transducer 4 provides a signal which is modulated at the frequency $f$, and such frequency of modulation is indicative of the velocity $v$ of the fluid past the strut 2. If $l$ is the spacing between identical vortices, $l$ represents the distance travelled by one vortex in a time equal to the modulation period $1/f$ times the velocity $(v-u)$. Therefore $$l = (v/f)(1-k) \tag{2}$$

after above relation [1]) which shows that $l$ is a constant. It has been shown (see Chen. Y.N., Fluctuating Lift Forces of the Karman Vortex Streets on Single Circular Cylinders and Tube Bundles, ASME Paper No. 71–Vibr–12, May 11, 1971) that $K \cong 1/6$ for the complete range of Reynolds numbers for which the Strouhal number $(fd/v)$ is constant. For a 0.125 in. diameter strut, $l = .5$ in.

Figure 9:
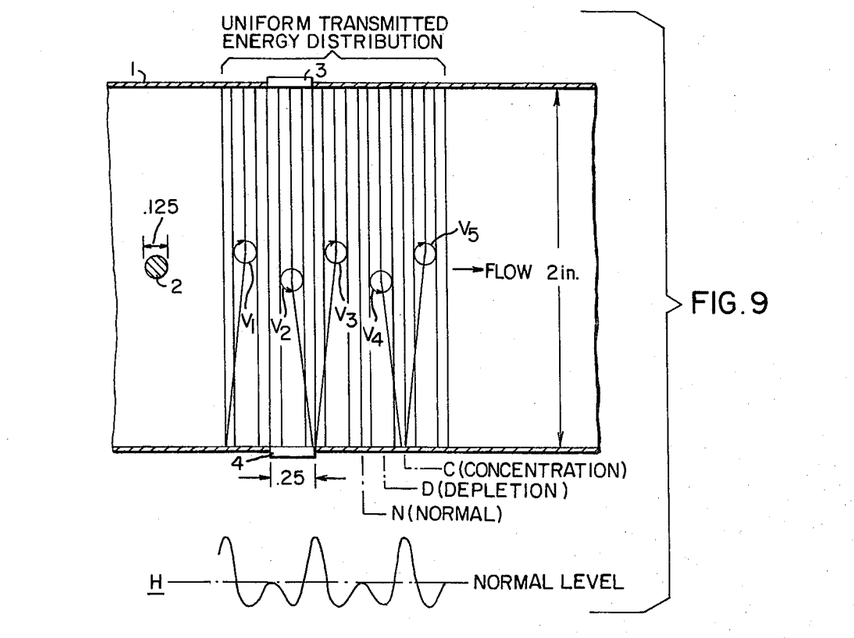
FIG. 9 represents the energy distribution of a uniform field of acoustic energy after modulation by a vortex street, and the modulation curve so derived.

It thus appears that a pair of transducers coupled across the stream such as 3, 4 are in fact seeing the succession of vortices passing in the wake of the strut 1. Reference should be had here to FIG. 9 which represents the pattern of the disturbance due to a succession of vortices in a uniform field of acoustic beams, an ideal situation for the purpose of clarity in explaining how modulation of the received beam occurs. Curve H represents the modulation of energy received. If one receiving transducer such as 4 is located somewhere along the vortex street, the effect will be the same in response to a transmitting transducer such as 3, as if the entire pattern shown was being displaced before it. Curve H shows the peaks and valleys which then characterize the output signal from transducer 4.

Detection of the modulation of a propagated acoustic wave by the disturbance has been made in different ways. One solution described in application Ser. No. 276,479 of McShane filed July 31, 1972, consists in measuring travel time as affected by increased velocity and decreased velocity, due to the presence of the vortices, transversely of the direction of flow. Another solution is described by R. D. Joy and R. F. Colton in U.S. Pat. No. 3,680,375 issued Aug. 1, 1972. The latter consists in detecting amplitude modulation due to refractions and/or reflections of the acoustic wave by the vortices. More generally, when an acoustic wave is propagated transversely through a zone of a stream disturbed by an obstruction, such as strut 2, the received acoustic wave is in the form of a carrier modulated by the fluid at a frequency which is characteristic of the velocity of the fluid stream. The modulation is detected by conventional electronic means to provide a signal having the shape of the modulation envelope and the frequency of the detected signal is extracted by a count which is a measure of the velocity $v$ of the fluid.

The prior art technique is defective in two respects: sensitivity and accuracy. The low level of modulation of the acoustic wave received by transducer 4, especially at low velocities and with viscous fluids, affects adversely the reliability of measurement. Also, as shown by curve H of FIG. 9, the shape of the modulation signal is not sinusoidal. This is a cause of error in the count of peaks, or zero-crossing since counting is made under the assumption that the signal at the frequency $f$ is sinusoidal.

The present invention is based on the new discovery made by applicant that when two acoustic paths are used, instead of one, and the amplitude modulated signals derived for each path are combined, the modulation is enhanced to such a degree that as much as 100% modulation is obtainable. The enhancement of the modulation portion is correlative to a reduction of the carrier portion of the received signal. This favorably affects both the level and the wave form of the modulation envelope. As a result detection becomes easier and more accurate. It can be inferred from general knowledge that an acoustic wave, when affected by a disturbance transverse to a stream of fluid, experiences change in amplitude, and in phase as well. As a result of the pattern of the disturbances, no two acoustic paths are affected equally, and therefore a combination of such differently modulated signals, it is expected, will provide a composite wave of much different characteristic. In particular, it is conceivable that for selected paths when the carrier is cancelled altogether, the combined signal will be only a composite of the two modulations. Maximum enhancement is achieved when the carrier of each modulated signal experiences opposite effects from the disturbance in the respective acoustic paths. For instance if one wave is undergoing an increase in amplitude while the other wave is undergoing a decrease, a subtraction of signals will amplify these separate effects. Selection of the spacing of the acoustic paths is therefore important in deriving an enhanced modulation.

Figure 3:
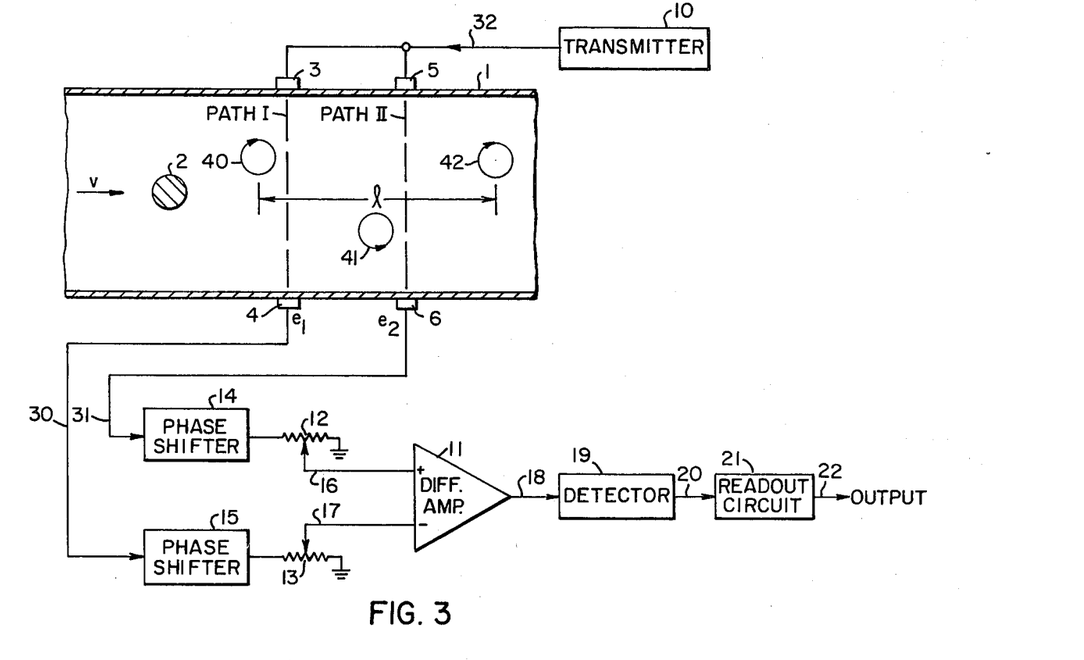
FIG. 3 illustrates a circuit for combining signals derived along two separate paths in accordance with the present invention.

In order to analyze the behavior of acoustic waves propagated along two different paths across a Karman vortex street, reference is now made to FIG. 3 which, besides a transmitter transducer 3 and a receiver transducer 4 associated with a first acoustic path, shows two more transducers, e.g., a transmitter transducer 5 and a receiver transducer 6, defining a second acoustic path. For the sake of explanation, the two paths are assumed to be separated by a distance ½, e.g. by the distance between two consecutive vortices. With such separation between the acoustic paths, the voltages of the received signals are as follows:

$$e_1 = E_1(1 + m_1 \sin\omega_m t)\sin\omega_c t \tag{3}$$

for the first path;

$$e_2 = E_2(1 + m_2 \sin(\omega_m t - \phi)\sin\omega_c t \tag{4}$$

for the second path;
where $E_1$ and $E_2$ are carrier amplitudes, $m_1$ and $m_2$ are modulation indices (the value is 1 at 100% modulation) $\omega_m = 2\pi \times$ modulation frequency, $\omega_c = 2\pi \times$ carrier frequency, and $\phi$ is the modulation phase shift resulting from path separation.

It is assumed that the acoustic waves are transmitted and received in phase when there is no modulation, mainly when $m_1 = m_2 = 0$. If the two received signals are subtracted, from relations (3) and (4) $e_2 - e_1$ is expressed as follows:

$$e_2 - e_1 = [(E_2 - E_1) + (m_2 E_2 \sin(\omega_m t - \phi) - m_1 E_1 \sin \omega_m t)] \sin \omega_c t$$

or, $$e_2 - e_1 = [(E_2 - E_1) + K \sin(\omega_m t - \alpha)] \sin \omega_c t \quad (5)$$

where $$K = [(m_2 E_2)^2 + (m_1 E_1)^2 - 2 m_2 E_2 m_1 E_1 \cos \phi]^{1/2},$$

and where $$\alpha = \tan^{-1} m_2 E_2 \sin \phi / m_2 E_2 \cos \phi - m_1 E_1$$

Figure 2:
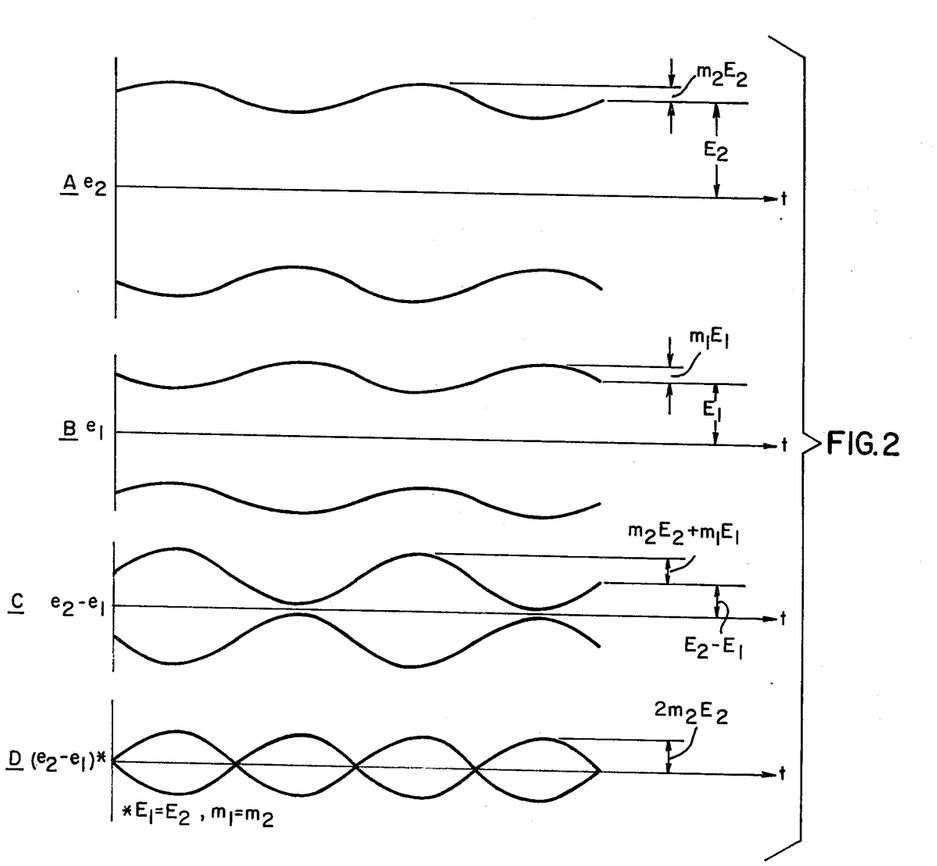
FIG. 2 represents two modulated signals derived from two separate acoustic paths, and a signal of enhanced modulation obtained by combining the two modulated signals in accordance with the present invention.

Equation (5) shows that as a result of the subtraction, the carrier frequency component, $(E_2 - E_1) \sin \omega_c t$, is reduced in amplitude relative to the separate amplitudes $E_1$ and $E_2$, and that the modulation component may be increased by an amount dependent on $\phi$. FIG. 2 shows curves A and B representing amplitude modulated signals $e_2$ and $e_1$ as derived from transducers 4 and 6 for two respective paths. For the particular location of the transducers of FIG. 1, $\phi = \pi$, and $K = m_2 E_2 + m_1 E_1$ with $\alpha = 0$. The third waveform C in FIG. 2 illustrates a nearly optimum result in that the increased modulation amplitude and the decreased carrier amplitude provide approximately 100% modulation. The modulation index (or percentage) is increased even if $\phi \quad \pi$ as long as sufficient cancellation of the carrier component occurs.

When $E_1 = E_2$, the carrier component is cancelled completely and the resultant signal is $$e_2 - e_1 = K \sin(\omega_m t - \alpha) \sin \omega_c t \quad (4)$$

When $m_1 = m_2$ and $\phi = \pi$, Equation (4) reduces to $$e_2 - e_1 = 2 m_1 E_1 \sin \omega_m t \sin \omega_c t \quad (5)$$

As a result of the complete cancellation of the carrier component, the amplitude of the resultant signal will be given by $K \sin(\omega_m t - \alpha)$, which, as shown by curve D of FIG. 2, reaches a peak twice each modulation cycle.

Curves A and B of FIG. 2 represent the two modulated signals. If curves A and B are subtracted from each other, curve C is obtained which represents $e_2 - e_1$, and exhibits an enhanced modulation. Curve D of FIG. 2 is the curve C in the very particular situation where signals $e_1$ and $e_2$ have the same vectorial magnitude ($E_1 = E_2$) and where the modulations ($m_1$ and $m_2$) are the same. This is a nearly optimum condition for increasing modulation amplitude, and the decreased carrier amplitude ($E_2 - E_1$) provides approximately 100% modulation. Detection of velocity is good when this particular condition is met. The flowmeter is then calibrated for twice the frequency to be measured. However, the conditions referred to above (equal carrier amplitudes, equal carrier phases, and equal modulations) may be too critical to maintain. It is desired in practice to have more freedom of choice. Therefore the case of curve D is not preferred in general.

While curves A through D of FIG. 2 rest on the assumption that only amplitude modulation takes place, it is believed that the signals of the two paths are not only modulated in amplitude but also in phase. If amplitude modulation of an acoustic beam can be accounted for in terms of the explanations given in the aforementioned U.S. Pat. No. 3,680,375, namely as being caused by variations of the energy received from the beam after refractions or reflections due to the Karman vortex street, the acoustic wave in fact can also be expected to experience alterations of phase. This results from a consideration of the transverse velocities which alternately advance or retard the phase of the arriving signal, as suggested in copending application Ser. No. 276,479 filed July 31, 1972 by applicant. The impact of such observation has not been perceived by the prior art because, while only one acoustic path was used, only amplitude modulation was detected in the velocity measurement. However, whenever two acoustic paths are taken in conjunction for the measurement, phase modulation can no longer be ignored since it directly affects the characteristics of the combined signal. The combined signal will be modified in its amplitude not only as a result of amplitude modulation, but also as a result of the separate phase fluctuations. The present invention takes advantage of enhanced modulation due to both amplitude and phase modulation of the wave through the use of separate acoustic paths with a combination of the received acoustic signals.

Figure 7:
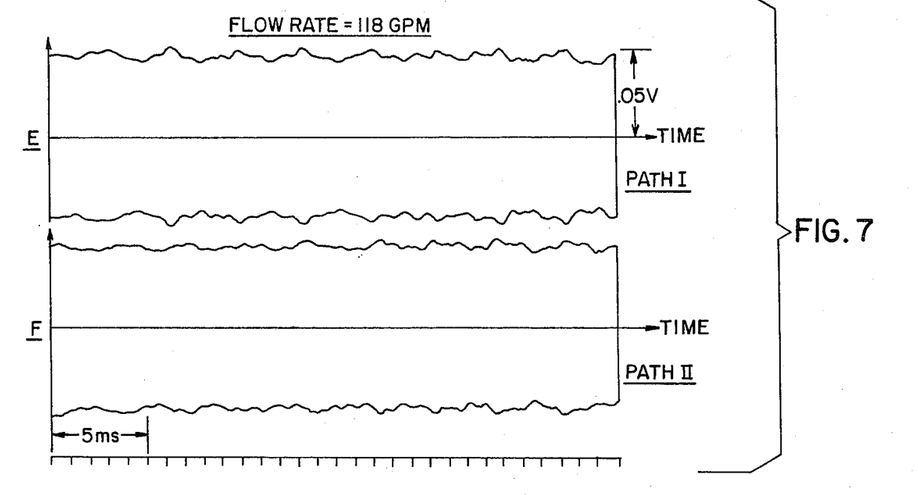
FIGS. 7 and 8 are curves representing signals actually obtained in practicing the present invention.
Figure 8:
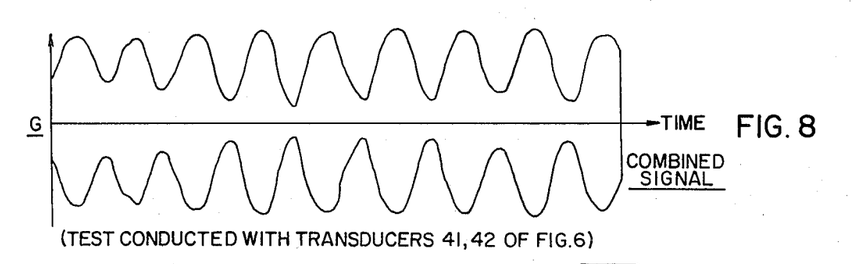

In order to better appreciate this cumulative effect on the modulation by the vortices when two modulated acoustic waves from separate paths are combined, reference is made to FIG. 7 representing curve E as the carrier wave modulated after propagation across one path, curve F representing the carrier wave modulated after propagation across the second path, both paths being across vortices. FIG. 8 shows on curve G the enhanced modulation resulting from a combination of the two signals of FIG. 7. These are the results of actual flowmeter operations conducted in accordance with the present invention, for a flow rate of 118 gpm. The signals of curves E, F and G are represented with a scale of 0.05 volts per unit on the ordinate axis, and 5 ms per unit on the time axis. The scale for curve 4 is also 0.1 V/cm, and 5 msec/cm. It is clear from FIG. 7 that the modulation, expressed by the amplitude of the carrier, is small for each path taken individually. In contrast very distinct peaks are present with the combined signal of FIG. 8. This is most beneficial for further processing, and a more reliable and more accurate measurement of the velocity of the fluid is possible on the basis of signal G than would be possible with any of the signals of FIG. 7 which belong to the prior art.

It is worth noticing that fluctuations in the phase of the carrier as generated in a single acoustic path may also be detected by combining the electrical signal applied to the transmitter transducer and the electrical signal generated by the receiver transducer. A difficulty with this technique is that slight changes in carrier frequency might cause a large phase shift at the receiver end after being multiplied a number of times equal to the number of wavelengths existing between the transmitter and the receiver. This problem does not arise when the combined signals are taken from the receiver side along two separate paths because, in the latter case, phase shifts due to carrier frequency, as well as phase shifts due to changes in sound velocity, are essentially the same for both receivers, hence are cancelled out.

In the light of the preceding considerations, detection of modulation is obtained by combining the modulated signals received along two different acoustic paths, such as defined by transmitter 3, 5 and receivers 4, 6 on FIG. 3. The invention is not limited to acoustic paths at 90° to the direction of flow. The two paths need not be in a common plane passing by the longitudinal axis of fluid flow. One transmitter may even be with a receiver, for different paths, on the same side relative to the vortex street. The important thing is that each receiving transducer "sees" the pattern of vortices travelling along the axis of fluid flow. The separation between two acoustic paths, need not be ½ as shown on FIG. 1, since, as above explained, there is a phase difference between two acoustic paths even when they are very close. Any two paths will provide enough difference between the separate amplitude modulations of a carrier wave that enhancement in the modulation obtain when the two received signals are combined in accordance with the present invention. Such enhancement is even obtained when only one of the two paths is propagated through the Karman vortex street. Thus, one pair of transducers could be placed ahead of the strut, or after, far enough in order not to be affected by the disturbance. The unmodulated signal so derived will be combined with a signal obtained after modulation by the vortices.

For certain applications, it may be desirable to use a reflecting surface, in the path of an acoustic beam directed across the disturbances, and to locate the receiving transducer on the path of the reflected beam.

Transmitter and receiver of one acoustic path could then be placed on the same side with relation to vortices, when the energy is reflected back from the conduit wall, the obstacle, or some reflector, then received by the transducers. In such case, for each path it is possible to use a single transducer as transmitted and receiver, bursts of the carrier wave, rather than a continuous wave, are transmitted.

Indeed, the acoustic paths do not have to be parallel to each other, or orthogonal about the longitudinal axis of flow. Acoustic paths at an angle to such longitudinal axis are workable too. For instance, one transmitter may be coupled with two receiver transducers, or a single receiver may be disposed so as to receive waves from two different transmitters. It is conceivable that the enhancement effect according to the present invention is obtained also when more than two acoustic paths are used.

FIG. 3 shows one mode of implementing the present invention. A transmitter 10 generates a continuous wave signal supplied over line 32 to two transmitting transducers, 3 and 5, mounted on a conduit 1 in which a stream of fluid is entrained with a velocity to be measured. In the conduit is disposed a strut 2 obstructing partly the flow and of sufficient cross-section to generate vortices such as $V_1$, $V_2$, $V_3$. The transducers 3 and 5 transmit acoustic waves across the fluid along two separate paths I and II, in a zone where the vortices travel. On the opposite side of the conduit 1, two receiving transducers 4 and 6 are associated with the two acoustic paths, respectively. Signals are derived from the two transducers 4, 6, along separate lines 30, 31, connected to respective phase shifters, 14, 15 and potentiometers 12, 13 supplying (along lines 16, 17) inputs to an operational amplifier 11 connected as a differential. The output 18 of amplifier 11 is connected to a detector 19, the output of which is supplied over line 20 to a readout circuit that is basically a counter, or frequency meter, 21 deriving a signal output which is a measure of the velocity of the fluid flowing in conduit 1. This circuit is unique in that it combines the outputs of two transducers such as 4, 6, for separate acoustic paths through a zone of vortices. However, FIG. 3 is only illustrative of one mode of implementation of the present invention. When the transmitter 10 is generating a continuous signal at the carrier frequency, an acoustic wave is propagated from transducers 3 and 5 through the Karman vortex street. A transverse velocity effect occurs between vortices which is aiding or opposing normal propagation of the acoustic wave across conduit 1, depending on the senses of rotation of the two successive vortices on either sides of the acoustic beam. Another effect on the propagation of the acoustic beam results from the opposite rotation of the oppositely located vortices which in various degrees deflect the acoustic beam. The second effect is illustrated by curve H on FIG. 9. The first effect just mentioned has been described in the operation of a travel time detection apparatus and method in the afore-mentioned McShane application, Ser. No. 276,479. The second effect is predominant in the mode of detection used by the afore-mentioned Joy patent and the afore-mentioned Blackwell patent application. In contrast, it seems that both effects are obtained with the mode of detection according to the present invention, and this may explain the enhancement of modulation derived in this particular situation. The modulated carrier signals, generated by the receiving transducers, 4 or 6, are as shown by waves E, F of FIG. 7. Phase shifters 14, 15 are included in the respective channels in order to provide compensation for phase differences at the carrier frequency which could result from differences in the transducer characteristics and also from differences in the lengths of the acoustic paths, since these would be differences not characterizing the vortex effects. Also a potentiometer, 12 or 13, is provided in each channel in order to adjust the magnitude of the carrier signal at the receiving end so as to match the transmission by the two acoustic paths and channels, since there is a common transmitter. In this fashion, cancellation of the carrier signal can be achieved and the differences in transducer characteristics are compensated for. Subtraction of the signals so derived is accomplished by the differential amplifier 11, and the output 18 provides a signal similar to curve G of FIG. 8. However, the carrier signals need not be in phase. The critical condition of curve D of FIG. 2 is only one form of the present invention. A carrier phase difference may be desirable as a means of preventing complete cancellation of the carrier signal in order to avoid creating a modulation in excess of 100%. Such desirable condition may be obtained by adjusting phase shifter, 14 or 15, and potentiometer, 12 or 13. Instead of using phase shifters and potentiometers such as shown on FIG. 3, individual control of the signals to be combined can be obtained by adjusting the feedback components of the amplifier 11 for each channel. Although transmitter 10 is said to generate a continuous wave signal over line 32, it is also possible to so excite transmitting transducers 3 and 5, that they generate tone bursts as can be done with a gated continuous wave generator, or with modulated transmitted signals. This results in reducing standing wave effects on the received signal strength. In each instance, the acoustic wave will be modulated by the vortices and a combination of the signals received from two separate acoustic paths will provide the enhancement of modulation afforded by the present invention. When gating or modulating a continuous wave generator, it is advisable to choose, as the gating, or modulating, frequency, a frequency which is geometrically intermediate between the carrier frequency (for instance 5MH$_z$) and the vortex frequency (of the order of 500 H$_z$). This choice of frequency permits an easy removal of first the carrier and thereafter the applied gating, or modulation, which is done in two successive stages of detection. The vortex frequency signal is thereby derived. This method reduces the formation of standing waves. When modulating the signal applied to the transmitting transducer, sinusoidal modulation is preferred since the phase of this modulation would be much less sensitive to small path length differences than would the carrier. As a result, after removal of the carrier signal by the first detector, the intermediate signals would still be modulated at the vortex frequency to be measured. Another advantage is that since such geometrically intermediate frequency signals could be assumed to be in phase, phase shifters can be eliminated altogether from the circuitry.

Signal combination according to the present invention can also be accomplished by mounting the transducers with opposite polarities, in such a way that the received signals of opposite polarities be added rather than subtracted.

It is remarkable that modulation enhancement obtained when combining signals received from two separate acoustic paths in accordance with the present invention is also present when only one of the acoustic paths effectively crosses the Karman vortex street, for instance, if the other path is disposed upstream well ahead of any disturbance by the strut, so that an unmodulated signal be received. When such unmodulated signal is combined with a signal modulated by the vortices, carrier cancellation is effected and phase differences also cause an increase in the modulation index.

In the light of the method and apparatus described in the above-mentioned copending application Ser. No. 175,463 of R. E. Blackwell filed Aug. 27, 1971 for "Flow Meter," it is clear that not only modulation by the Karman vortex street is useful for fluid velocity measurement, but also the frontal zone where shedding on either side of the strut occurs. Therefore, the preceding explanations apply when at least one of the two separate acoustic paths according to the present invention passes through such frontal zone.

Although many combinations of transmitting and receiving transducers are possible within the scope of the present invention, three particularly interesting and practical transducer configurations will now be described by reference to FIGS. 4, 5 and 6.

Figure 4:
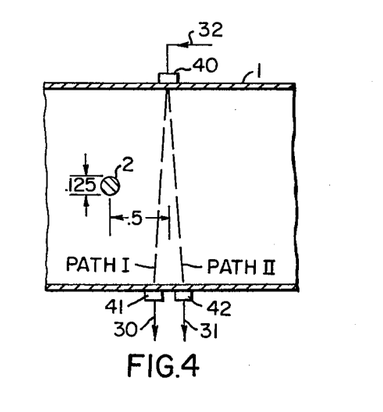
FIGS. 4 and 5 show two different transducer arrangements according to the present invention.
Figure 5:
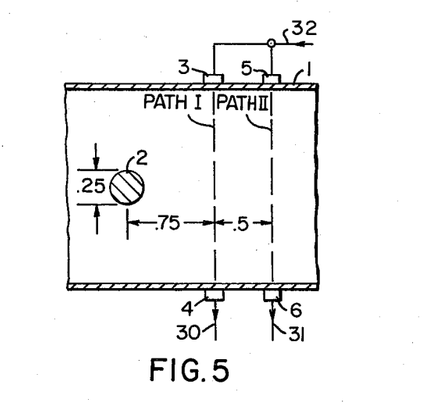

FIG. 4 shows a single transmitting transducer 40 associated with two receiving transducers 41, 42. Although the two acoustic paths so defined are not parallel, they do pass through different portions of the vortex pattern, and enhanced modulation effectively obtains. FIG. 5 represents two parallel paths separated by 0.5 inch, the path closest to the strut being 0.75 inch away therefrom. The strut has a diameter of 0.25 inch. In this particular case, the acoustic paths are ½ apart. The modulation is approximately $\pi$ out of phase, and peaks of one waveform coincide with valleys of the other. When carrier cancellation is effected, the double frequency critical condition of curve D of FIG. 2 is achieved. The conduit 1 shown on FIG. 4, or 5, is a 2 in. pipe. The transducer elements have a diameter of 0.188 in. and 5MH$_z$ is their frequency of excitation. The transducers are bonded to the pipe with conductive epoxy resin as the common ohmic contact for the transducers located on the same side of conduit 1.

Figure 6:
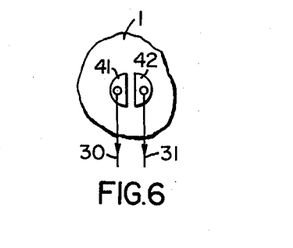
FIG. 6 shows a composite transducer according to the present invention.

FIG. 6 represents a double transducer which is typical for use in the context of the present invention. Instead of two separate transducers, a double transducer formed of two integral elements such as 41, 42 shown on FIG. 4, is used, made, for example by filing one transducer in two parts. The half disc shape of each part is easily accommodated in the standard equipment, which is of commercial advantage. In one commercial design, transducers are in the form of probes, which penetrate the duct walls. Practice shows that replacing the standard circular piezoelectric element with two semi-circular elements as in FIG. 6 provides the advantages of the present invention. Each element may be provided with two electrical leads with no built-in common connection. If these elements are connected in series opposition, such double unit can be used with a standard unit, and either unit could be operating as a transmitter. If the two elements are connected individually so as to provide separate outputs, these outputs can be combined as explained hereabove. In either case the double transducer generates signals from two separate acoustic paths and a combination of signals takes place resulting in enhanced modulation in accordance with the present invention. Another observation which can be made, is that even when the two selected acoustic paths are as close as possible to each other, modulation enhancement obtains. This is a confirmation that phase modulation is an important factor when combining the two received signals as above theorized.

Indeed the invention is not limited to detection with transducers mounted on a conduit. Flow meter technique can be used in all generality in accordance with the principles disclosed therein. Also "acoustic" should be taken as synonymous with "sound." This term encompasses a subsonic source (audible), and ultra-sonic frequencies, although ultra-sonic frequencies are preferred. Also the use of a strut 2 is only one way of causing vortex shedding. Many types of bodies as shown in the prior art, or as readily conceivable, can be used.

Of real advantage over any of the prior art techniques is the fact that, as a result of increased modulation, with the flow meter according to the present invention more accurate velocity measurement is possible and velocities slower than before and in viscous fluid can now be successfully measured.

What we claim is:

1. The method of measuring the velocity of relative movement between a fluid and an object immersed therein, said object creating periodic fluid disturbances in a pattern along a direction of disturbances, said periodic disturbances being characteristic of said velocity, said method comprising the steps of:

directing individual acoustic signals along at least two respective separate acoustic paths in the fluid at an angle to said direction of disturbances, and with at least one of said paths being through said disturbances;

receiving said acoustic signals after traveling along said paths whereby at least one acoustic signal is modulated by said periodic disturbances thereby to provide a signal having a modulation envelope;

combining the received acoustic signals into a combined signal of increased modulation index relative to the modulation index of the received acoustic signals;

and deriving a representation of the modulation of said combined signal as an indication of said velocity.

2. The method of claim 1 wherein said increased modulation index represents the sum of the modulation indexes of the respective said acoustic signals.

3. The method of claim 2 wherein said combined signal is obtained by subtracting the carrier portions of the respective said acoustic signals.

4. The method of claim 1 wherein said acoustic paths are both through said disturbances, said acoustic signals being equally affected by said fluid disturbances with a phase difference between the respective modulation envelope.

5. The method of claim 4 wherein said phase difference between said modulation envelopes is $\pi$ and carrier cancellation is effected, the detected modulation of said combined signal being twice the frequency of said modulation envelopes.

6. The method of claim 4 wherein said acoustic paths are selected to be in two parallel planes oriented at an angle to said direction of disturbances.

7. The method of claim 6 wherein the direction of disturbances is parallel to said velocity, the disturbances being in the wake of the immersed object.

8. The method of claim 6, wherein the direction of disturbances is transverse to said velocity, the disturbances being in front of said immersed object.

9. A method according to claim 1 wherein said individual acoustic signals are directed with a selected phase difference for adjusting the phase between said received acoustic signals.

10. A system for measuring the velocity of relative movement between a fluid and an object immersed therein, said object creating periodic fluid disturbances in a pattern along a direction of disturbances, with the periodicity of said disturbances having a frequency that is characteristic of said velocity, said system comprising;

means for directing acoustic signals along at least two respective separate acoustic paths in the fluid at an angle to said direction of disturbances, at least one of said paths being through said disturbances;

means for receiving said acoustic signals after travel along said paths, whereby at least one acoustic signal is modulated by said disturbances thereby to provide a signal having a modulation envelope;

means for combining the received acoustic signals into a combined signal of increased modulation index relative to modulation indexes of the received acoustic signals;

and meawns for deriving a representation of the modulation of said combined signal as an indication of said velocity.

11. A system according to claim 10 with said means for directing acoustic signals including first transmitting and receiving transducer means and second transmitting and receiving transducer means respectively associated with said separate acoustic paths, said means for combining said acoustic signals being responsive to the respective said first and second receiving transducer means.

12. A system according to claim 10 with said means for directing acoustic signals including first and second transmitting transducer means and with said means for combining said acoustic signals including receiving transducer means responsive to both said first and second transmitting transducer means.

13. A system according to claim 10 with said means for directing acoustic signals including transmitting transducer means, and first and second receiving transducer means respectively responsive to said acoustic signals along said separate acoustic paths, said means for combining said acoustic signals being responsive to the respective said first and second receiving transducers.

14. A system according to claim 13 with said first and second receiving transducer means comprising an acoustic transducer having a housing, two juxtapositioned transducer elements mounted in said housing, and two output connections respectively associated with said transducer elements.

15. A system according to claim 10 wherein said acoustic paths are defined by acoustic signals refracted by said disturbances.

16. A system according to claim 10 wherein means is provided for reflecting at least one of said acoustic signals, said means for receiving said acoustic signals being responsive to such reflected acoustic signal.

17. A system according to claim 10 with said means for combining said acoustic signals including means for subtracting the carrier portions of said acoustic signals after modulation.

18. A system according to claim 17 with said means for subtracting said carrier portions including differential amplifier means responsive to said acoustic signals after modulation.

19. A system according to claim 18 with said detecting means being responsive to said differential amplifier means for deriving a modulation signal, means being provided for deriving a signal characteristic of the frequency of said modulation signal as a representation of said velocity.

20. A system according to claim 19 with said acoustic signals directing means including signal transmitter means, transmitting transducer means responsive to said signal transmitter means, and receiving transducer means responsive to said acoustic signals along said separate acoustic paths, said differential amplifier means being responsive to said receiving transducer means.

21. A system according to claim 20 with phase shifting means being associated with at least one acoustic path to shift the phase between said acoustic signals after modulation.

22. A system according to claim 20 with means for adjusting the voltage inputs of said differential amplifier means, thereby to adjust the amplitude of the carrier portion in at least one of said acoustic signals after modulation.

23. A system according to claim 10 with said means for combining said acoustic signals including phase shifting means associated with at least one of said acoustic signals.

24. A system according to claim 10 wherein said acoustic paths are selected to be at $\pi$ phase difference in said pattern of disturbances.

25. A system according to claim 24 with said carrier portion being cancelled completely and with said detecting means being calibrated to detect twice said frequency.

26. A system according to claim 10 with said means for directing acoustic signals including first transmitting and receiving transducer means and second transmitting and receiving transducer means respectively associated with said separate acoustic paths, said means for combining said acoustic signal comprising said first and second receiving transducer means connected in series with opposite polarities, said means for deriving a representation of the increased modulation being responsive to said series connected receiving transducer means.

27. A system according to claim 10 wherein the spacing between said means for directing and said means for receiving acoustic signals in at least one of said separate acoustic paths is adjusted for varying the phase between said acoustic signals.

* * * * *